US008651293B2

(12) United States Patent
Boyer

(10) Patent No.: US 8,651,293 B2
(45) Date of Patent: Feb. 18, 2014

(54) SINGLE AND DOUBLE DOOR STORAGE RACK

(75) Inventor: Michael C. Boyer, Taylors Falls, MN (US)

(73) Assignee: Gear Grid, LLC, Forest Lake, MN (US)

( * ) Notice: Subject to any disclaimer, the term of this patent is extended or adjusted under 35 U.S.C. 154(b) by 0 days.

(21) Appl. No.: 12/765,262

(22) Filed: Apr. 22, 2010

(65) Prior Publication Data

US 2011/0259842 A1 Oct. 27, 2011

(51) Int. Cl.
*A47H 1/00* (2006.01)

(52) U.S. Cl.
USPC .................... 211/104; 211/90.02; 211/195

(58) Field of Classification Search
USPC .............. 312/324–326, 329, 319.2, 242, 245; 211/104, 90.03, 90.04, 150, 189, 195, 211/186, 90.02, 86.01, 87.01; 49/61–63, 49/67, 68, 125, 394; 256/73; 52/70, 71; 220/6, 7, 1.5, 477; 296/3, 37.1, 37.6, 296/57.1; 248/240, 240.4
See application file for complete search history.

(56) References Cited

U.S. PATENT DOCUMENTS

| | | | | | |
|---|---|---|---|---|---|
| 1,693,860 | A | * | 12/1928 | Olson | 16/85 |
| 1,835,535 | A | * | 12/1931 | Stocker | 220/7 |
| 3,025,937 | A | * | 3/1962 | Finkel | 49/177 |
| 3,620,388 | A | * | 11/1971 | Mansson | 108/53.1 |
| 3,895,849 | A | * | 7/1975 | Zehr | 312/324 |
| 4,118,085 | A | * | 10/1978 | Fibus | 312/245 |
| 4,146,994 | A | * | 4/1979 | Williams | 49/367 |
| 4,262,448 | A | * | 4/1981 | Flider | 49/367 |
| 4,324,446 | A | * | 4/1982 | LeSage | 312/245 |
| 4,561,705 | A | * | 12/1985 | Schafer | 312/244 |
| 4,657,149 | A | * | 4/1987 | Masson | 211/194 |
| 4,678,090 | A | * | 7/1987 | Ross | 211/150 |
| 4,703,981 | A | * | 11/1987 | Stewart | 312/258 |
| 4,778,213 | A | * | 10/1988 | Palmer | 296/26.11 |
| 5,050,745 | A | * | 9/1991 | Sanders | 211/85.2 |
| 5,087,105 | A | * | 2/1992 | White | 312/245 |
| 5,415,311 | A | * | 5/1995 | Coogan | 220/6 |
| 5,547,271 | A | * | 8/1996 | Rydell | 312/211 |
| 5,577,819 | A | * | 11/1996 | Olsen | 312/242 |
| 5,588,725 | A | * | 12/1996 | Frank | 312/245 |
| 5,755,480 | A | * | 5/1998 | Bryan | 296/26.01 |
| 5,765,892 | A | * | 6/1998 | Covington | 296/26.03 |
| 5,806,907 | A | * | 9/1998 | Martinus et al. | 296/26.11 |
| 5,832,666 | A | * | 11/1998 | Flack et al. | 49/67 |
| 5,842,770 | A | * | 12/1998 | Gold | 362/487 |
| 5,931,319 | A | * | 8/1999 | Murphy | 211/85.2 |
| 5,941,398 | A | * | 8/1999 | Harris | 211/60.1 |
| 5,941,588 | A | * | 8/1999 | Marconi | 296/26.11 |
| 5,944,399 | A | * | 8/1999 | Gillispie | 312/324 |

(Continued)

*Primary Examiner* — Darnell Jayne
*Assistant Examiner* — Hiwot Tefera
(74) *Attorney, Agent, or Firm* — Moss & Barnett

(57) ABSTRACT

The invention is a compact storage rack for holding and storing tools and other articles within a recess in a wall of a building or vehicle. The storage rack includes a back panel, mounting members for securing the rack in the recess and at least one door panel pivotally mounted to the mounting members. Each panel consists of a wire grid composed of pairs of generally parallel and equidistantly spaced horizontal bars secured together by generally parallel and equidistant vertical bars. The grid design allows visual inspection of the tools inside the storage rack to confirm what equipment is present and that it is properly mounted. The grid design also allows air to permeate the storage rack to air dry the tools stored therein. The swing door arrangement provides easy access to the equipment.

15 Claims, 17 Drawing Sheets

(56) References Cited

U.S. PATENT DOCUMENTS

| | | | |
|---|---|---|---|
| 6,155,622 A * | 12/2000 | Reed | 296/26.08 |
| 6,227,593 B1 * | 5/2001 | De Valcourt | 296/26.08 |
| 6,279,763 B1 * | 8/2001 | Bush | 211/195 |
| 6,513,850 B1 * | 2/2003 | Reed | 296/26.08 |
| 7,044,178 B1 * | 5/2006 | Campbell | 144/285 |
| 7,226,100 B1 * | 6/2007 | Willey et al. | 296/26.11 |
| 7,963,621 B1 * | 6/2011 | Ellis | 312/242 |
| 2002/0117945 A1 * | 8/2002 | Norman et al. | 312/315 |
| 2002/0153737 A1 * | 10/2002 | Fitts | 296/26.11 |
| 2003/0037489 A1 * | 2/2003 | McKernan | 49/63 |
| 2003/0098056 A1 * | 5/2003 | Fronek et al. | 136/244 |
| 2005/0016943 A1 * | 1/2005 | Dick | 211/70.6 |

* cited by examiner

SINGLE AND DOUBLE DOOR STORAGE RACK

FIELD OF THE INVENTION

The invention relates to compact tool storage racks. The present invention is useful for, amongst other things, holding and storing equipment within a recess located in the side or back of rescue trucks, fire trucks or other vehicles as well as recesses in walls of buildings.

BACKGROUND OF THE INVENTION

Common equipment storage racks for rescue or fire trucks include vertical aluminum panels slidably mounted within a recess located in the side of a truck for movement between a retracted or stored position fully within the truck recess and an extended position substantially extended outward from the truck. When the panels are fully extended from the truck recess, the tools mounted on the panel can be accessed.

Frequently, the tool positions on the panel are fixed and cannot be changed, limiting the type and amount of equipment that can be stored on the panel. Further, typically two or more panels are slidably mounted side by side in the recess to accommodate all of the equipment required by the firemen. When the panels are in their retracted position, the equipment stored on the front panel is minimally visible and the equipment stored on panels behind the front panel are not visible. Further, if one panel is fully extended outward to give the firemen access to the tools mounted on the panel, it may block visual inspection of and access to the tools on the other panels. Taking inventory of the equipment to confirm that all required equipment is in the storage system requires that each panel be opened individually.

Another storage system used in fire trucks or rescue vehicles includes a number of aluminum mounting tracks that are secured within the interior of typically metal cabinets located in a recess in the side or back of a vehicle. Holes must be drilled in the cabinet to secure the tracks to the cabinet. The mounting tracks are designed to receive tool holders for supporting a variety of fire equipment.

The cabinet doors eliminate or reduce the ability of the firemen to see the equipment stored in the cabinet to confirm that all necessary equipment is mounted in the cabinet. Further, the doors limit the amount of air circulation within the cabinet. If some of the equipment is wet when mounted on the tool holders within the cabinet, the tools may not adequately dry out, leading to rust or decay.

SUMMARY OF THE INVENTION

The present invention is a compact storage rack designed to be mounted within a recess in a wall of a building or a vehicle such as fire or rescue truck. The rack includes a back panel, a mounting assembly and at least one door panel pivotally mounted on the frame. In a closed position, the door panel is in spaced relation from the back panel; in an open position, the door panel can swing 90 degrees from its closed position to provide access to the equipment stored on the door and back panels.

The door and back panels consist of a wire grid of generally equidistantly spaced and parallel pairs of horizontal bars and vertical bars, although other configurations are possible. The grid panels provide a surface for conveniently and selectively mounting holders for tools, equipment, clothing or other articles. Tool holders can be mounted on the front of the back panel and on either or both sides of the door panels. The panels permit a visual confirmation of what tools, equipment, clothing or other articles are stored on the rack and that the holders and supported articles are properly mounted on the rack. Further, air is permitted to flow through the rack to help dry any articles stored on the rack.

In a second embodiment, two door panels are pivotally mounted to the mounting assembly in opposing relation (on opposite sides of the mounting assembly). A first door panel will have its axis of rotation located opposite and forward of the axis of rotation of the second door panel. This further expands the storage capability of the rack system, providing five panel sides for mounting equipment.

BRIEF DESCRIPTION OF THE DRAWINGS

Referring now to the drawings, wherein like reference numerals indicate corresponding structure through the several views.

DETAILED DESCRIPTION OF THE PREFERRED EMBODIMENT

Even though numerous characteristics and advantages of the present invention have been set forth in the following description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

Figure 1:
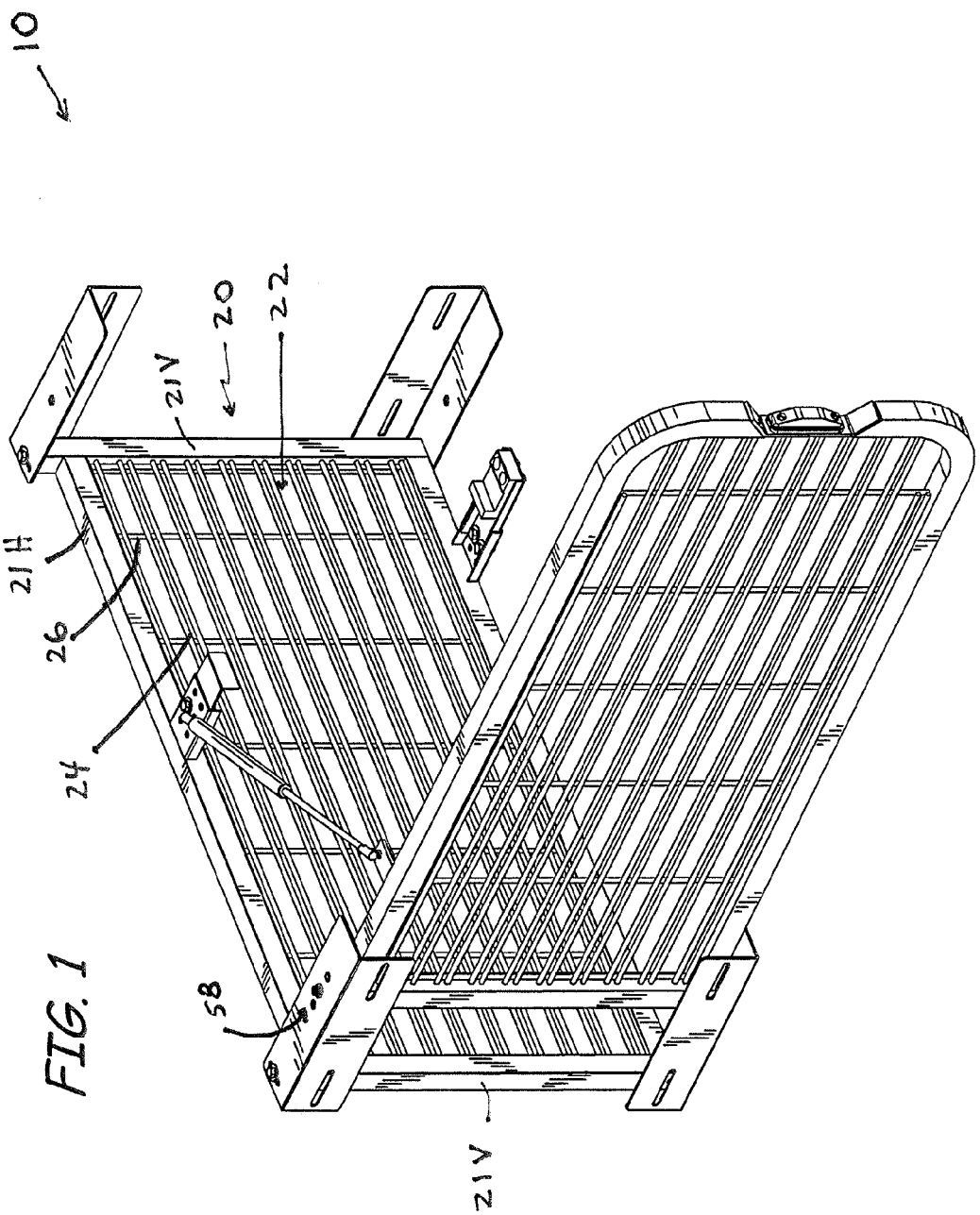
FIG. 1 is a perspective view of a single door storage rack of the present invention with the door panel in its open position.

A single door panel embodiment of the storage rack of the present invention is shown at 10 in FIG. 1. The storage rack 10 is designed to be mounted within a recess in the side of a motor vehicle or a wall in a building. The storage rack 10 includes a generally rectangular back panel 20, a mounting assembly 50 and a generally rectangular door panel 70 pivotally mounted between two vertically aligned mounting members. Door panel 70 rotates between a closed position substantially parallel to the back panel 20 in spaced relation to provide space for equipment mounted to the back panel 20 and on the inside of the door panel 70. In an open position, door panel 20 is generally perpendicular to the back panel 20. The back panel 20 ideally is secured to a back wall of the recess behind the mounting assembly but may be secured to the mounting assembly.

As shown in FIG. 1, the back panel 20 includes vertical frame members 21V and horizontal frame members 21H. The frame members are, in one embodiment, tubular steel having a generally square cross section, although other cross section configurations or other types of frame members can be utilized. Secured between the frame members is a grid 22 comprised of generally equidistantly spaced and parallel pairs of horizontal wires 24 secured to generally equidistantly spaced and parallel vertical wires 26. The wires may be of any desired size, although in one preferred embodiment, the wires have a ¼ inch diameter. Pairs of horizontal wires provide additional strength and are used to support tool holders, which in turn support the desired articles and tools on the grid 22.

Door panel 70 includes horizontal tubular frame members 72 (top) and 74 (bottom) and side frame members 76 and 78 having a generally square cross section configuration. Secured between the frame members is a wire grid 80 similar to grid 22 on back panel 20.

Figure 2:
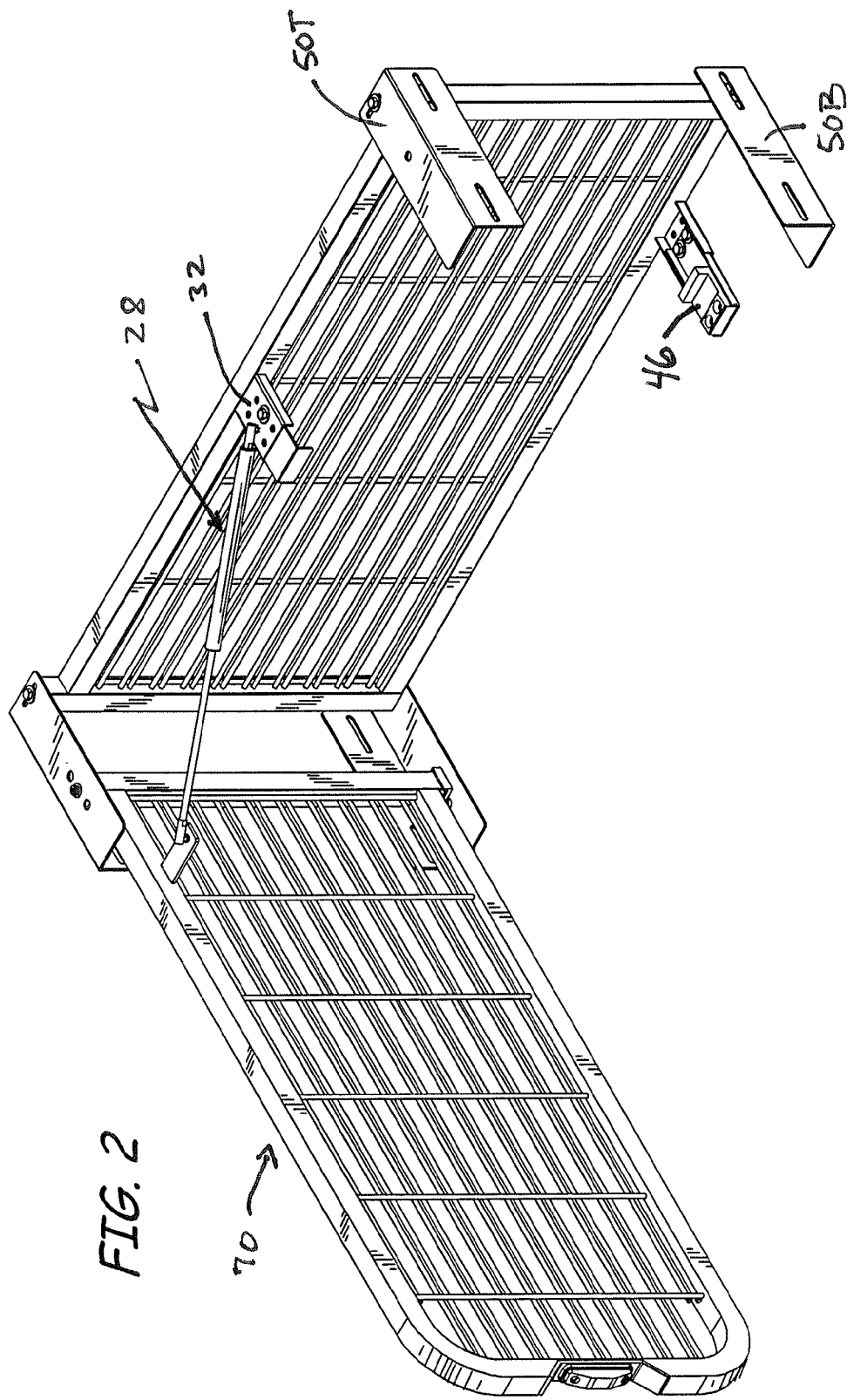
FIG. 2 is a perspective view of the single door storage rack of the present invention with the door panel in its open position, opposite that of FIG. 1.

The mounting assembly 50 includes four mounting members each having an L-shaped cross section. In one preferred embodiment of the storage rack, each mounting member 50 is secured to a different corner of the back panel 20. Mounting members at the top of the back panel 20 are identified as 50T and the mounting members located at the bottom of the back panel 20 are referred to as 50B. Door panel 70 is pivotally secured along side frame member 76 between a pair of vertically aligned top and bottom mounting members (50T and 50B). The axis of rotation of the door panel 70 is spaced from the back panel 20 as shown in FIGS. 1 and 2.

The mounting members 50T and 50B are used to secure the storage system within a recess in a wall of a building or a vehicle. Various holes and slots are provided on both sides of each mounting member 50 to facilitate securing the back panel 20 and door panel 70 to the mounting members 50, as well as providing openings for fasteners to secure the mounting members 50T and 50B within the desired recess. Adjustment holes, such as those shown at 58 in FIG. 1, are placed in close proximity to permit adjustment of the location of door panel 70 with respect to the back panel 20.

Figure 3:
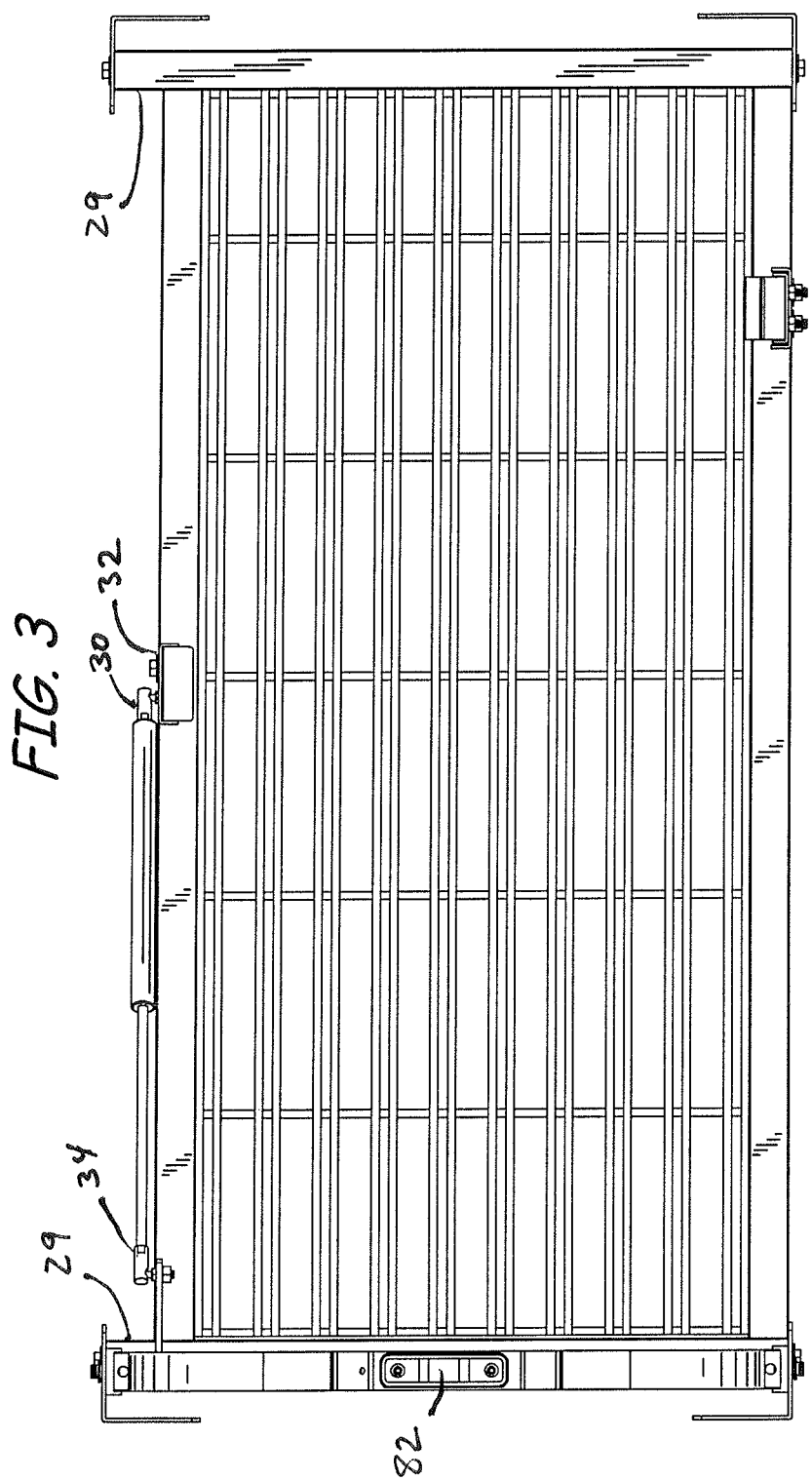
FIG. 3 is a front view of the single door storage rack of the present invention with the door panel in its open position.
Figure 4:
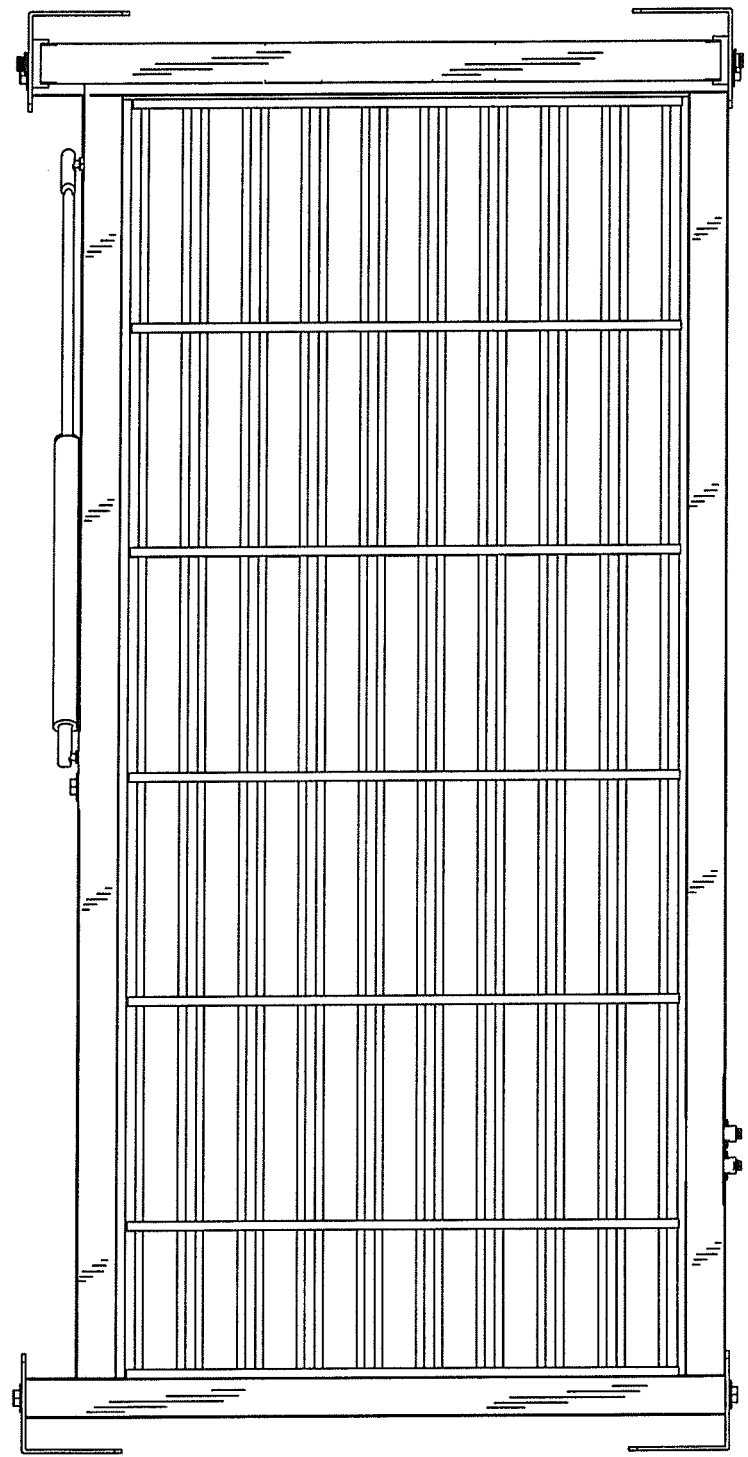
FIG. 4 is a rear view of the single door storage rack of the present invention with the door panel in its open position.
Figure 5:
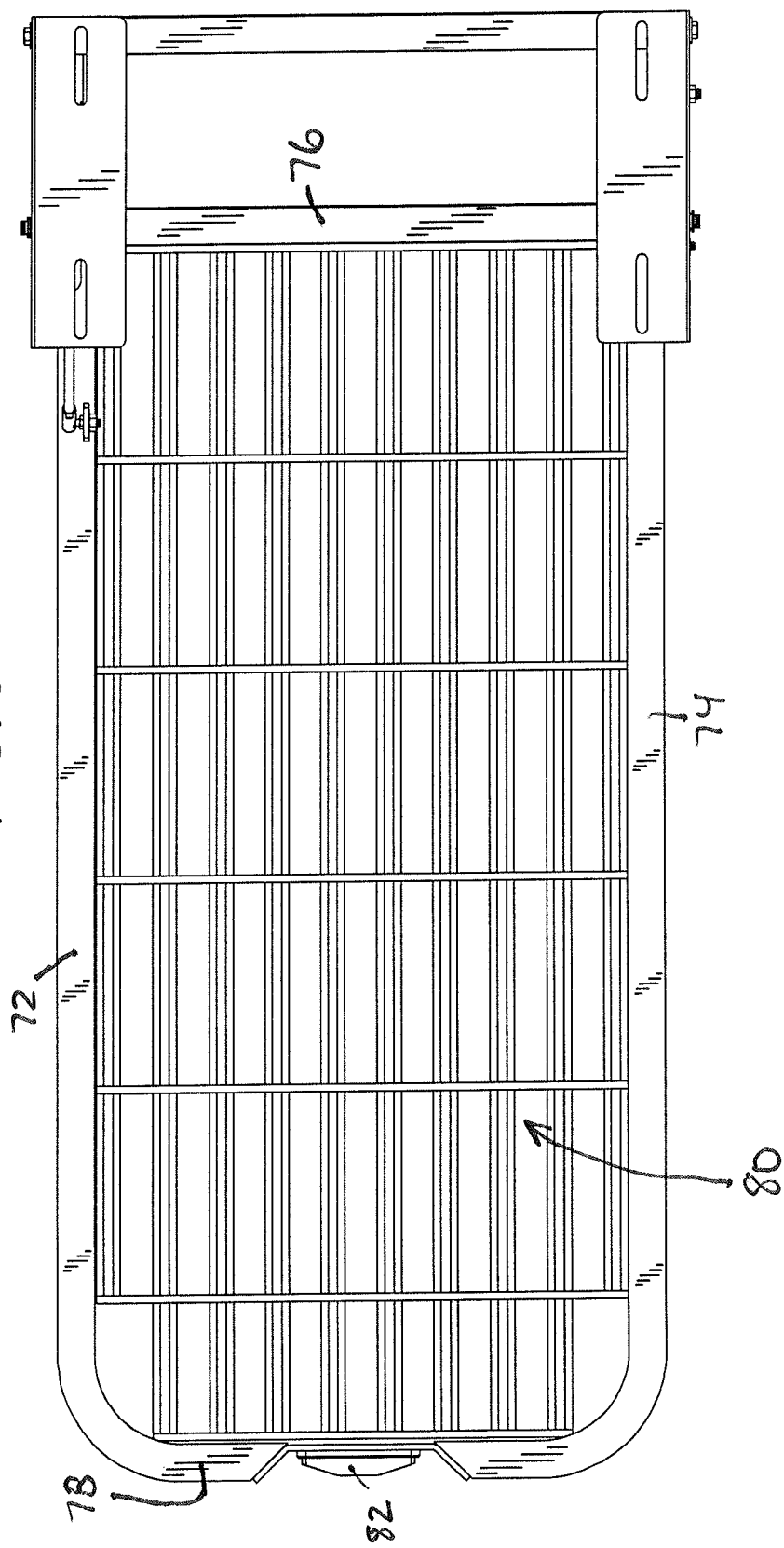
FIG. 5 is a side view of the single door storage rack of the present invention with the door panel in its open position.
Figure 6:
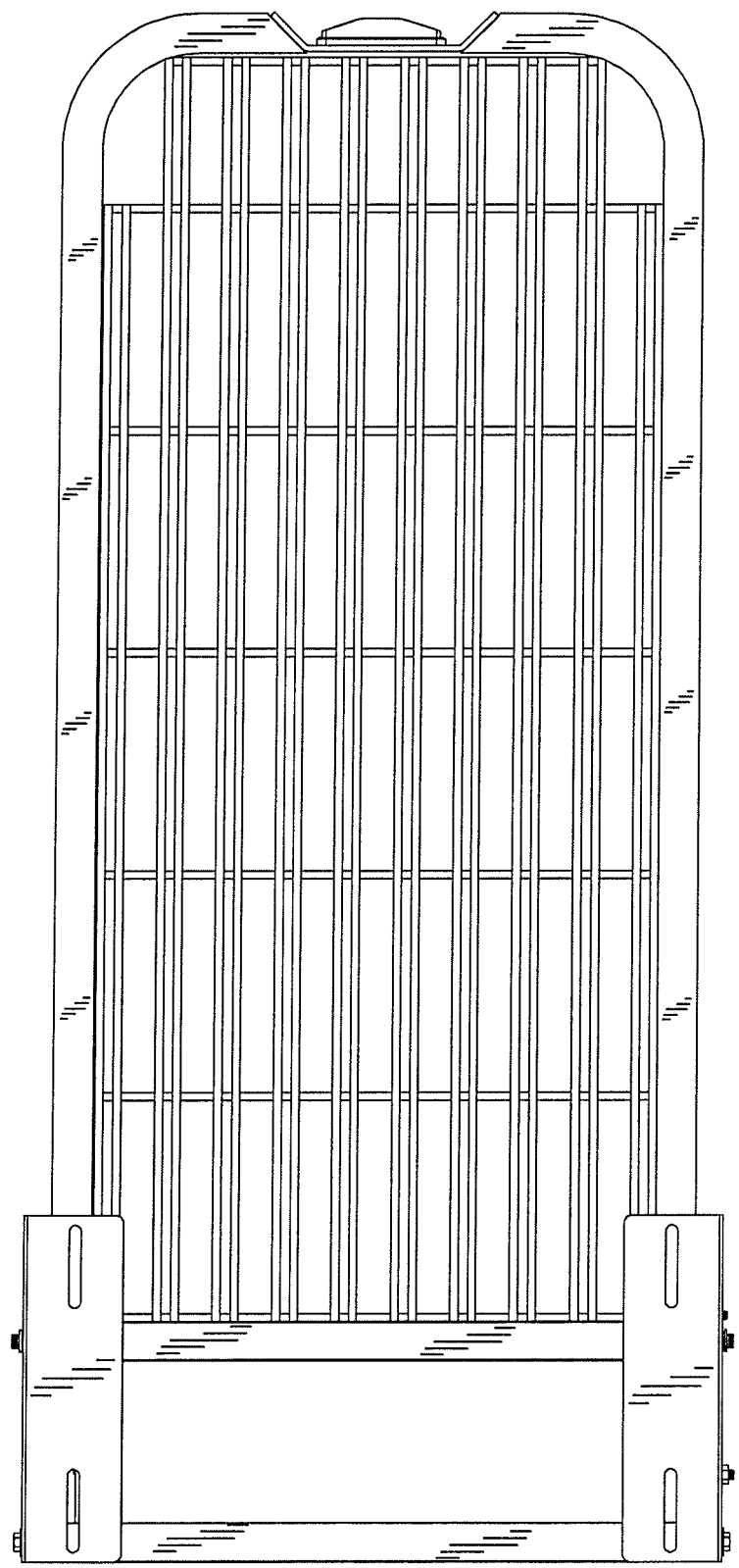
FIG. 6 is a side view of the single door storage rack of the present invention with the door panel in its open position, opposite that of FIG. 5.

As shown in FIG. 3, at the upper corners of the back panel 20, the vertical frame members 21V extend above the top horizontal frame member 21H at 29 to engage the upper mounting members 50T. This leaves room for operation of a spring assembly 28 pivotally secured at a first end 30 to and above a support bracket 32 which extends forward from the upper frame member 21H (towards the door panel 70 when in its closed position). A second end 34 of the spring assembly 28 pivotally engages a support tab 86 extending laterally inward from the top frame member 72 of door panel 70 as shown in FIGS. 1 and 2. Spring assembly 28 can be mechanical or operated on gas, liquid or by other means.

Figure 7:
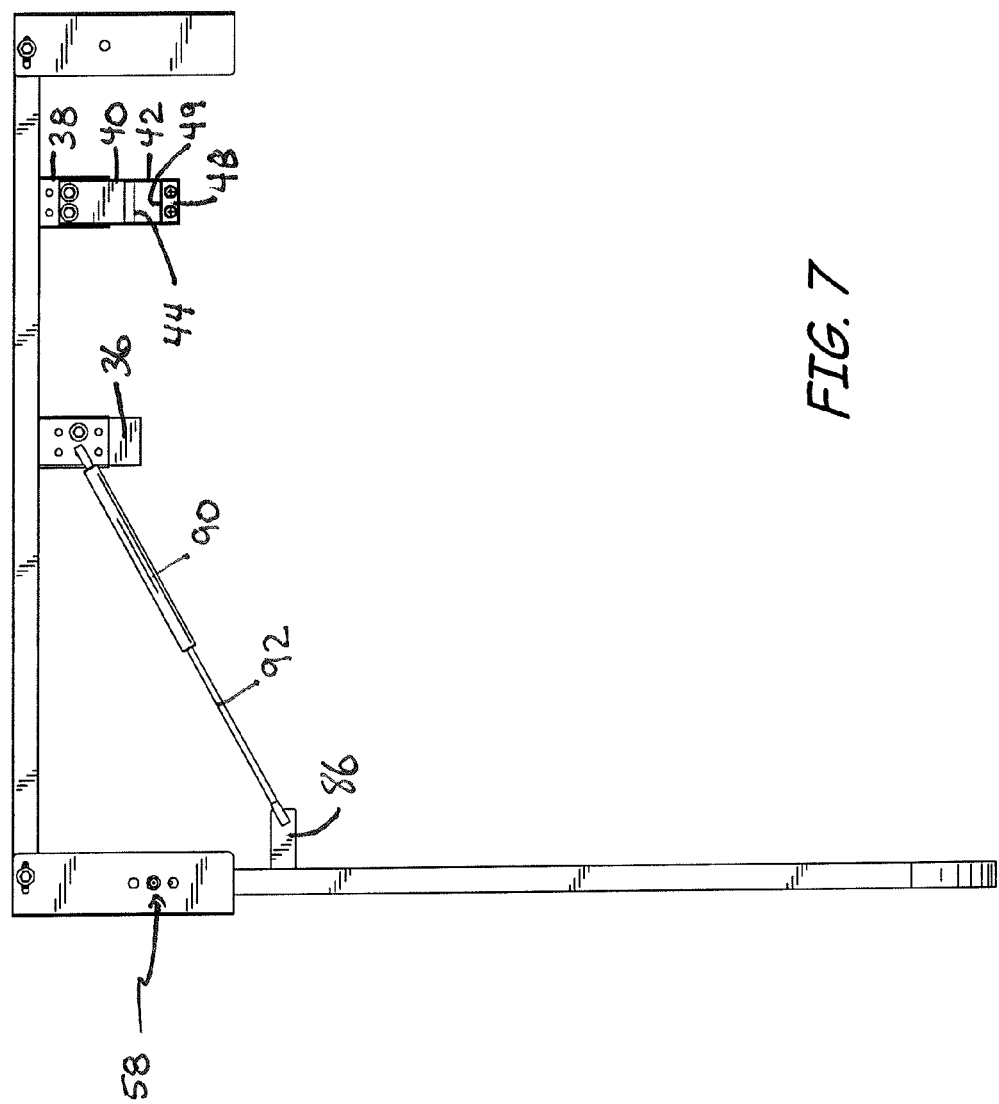
FIG. 7 is a top view of the single door storage rack of the present invention with the door panel in its open position.

As shown in FIG. 7, an L-shaped downward facing stop 36 is supported on an outer end of the support bracket 32 to limit the rotation of the door panel 70 towards the back panel 20, so that when door panel 70 is in its closed position, it will be positioned substantially parallel to and spaced from the back panel 20.

Also shown in FIG. 7, a second bracket 38 extends forward from the bottom frame member 21H of the back panel 20. Secured to the bracket 38 is a spring plate 40 that can be flexed up and down. Secured to an outer end of the spring plate 40 is an U-shaped latch 42 including at an end nearest the back panel 20, a vertical abutment 44 that acts as a stop to limit rotation of the door panel 70 towards the back panel 20 (much the same as stop 36). In front of the vertical abutment 44 is a horizontal support surface 46 for supporting the bottom of the door panel 70 when in its closed position and in front of the horizontal surface 46 is an inclined lip 48 that creates a ridge 49 at the back side of the lip 48 facing the stop 42 (see FIGS. 1 and 7). The ridge 49 is higher than the support surface 46 of the latch 42. The distance between the ridge 49 and abutment 44 is slightly greater than the width of the door panel bottom frame member 74.

When door panel 70 is rotated into its closed position, the door panel bottom frame member 74 will engage the lip 48, causing the spring plate 40 to flex downward. As the door continues to rotate towards the back panel 20, it will ride over the lip 48 onto the support surface 46, at which time the spring plate 40 will flex back upwards capturing the bottom frame member 74 of door panel 70 between the abutment 44 and the ridge 49, supported on support surface 46. To move the door panel 70 back to its open position (90 degrees from its closed position), the latch 42 is pressed downward, disengaging it from the bottom of the door panel 70, allowing the door panel 70 to be rotated away from the back panel 20.

Side frame member 78 has a shallow U-shaped configuration and is curved where it meets the top and bottom frame members 72 and 74 for aesthetic and safety reasons. In the middle of the frame member on the free side 78 of door panel 70, the tubular frame is replaced with a steel plate rather than tubular steel to permit the placement of a light 82.

As shown in FIG. 7, the spring assembly secured between the back panel 20 and door panel 70 includes a cylinder 90 and a spring operated rod 92 slidably mounted within the cylinder 90 for movement between a retracted and extended position. The rod is biased by means within the cylinder (not shown) in the extended position. When door panel 70 is in its open position, the spring assembly applies a biasing force against the door panel 70 to keep it in the open position.

Figure 8:
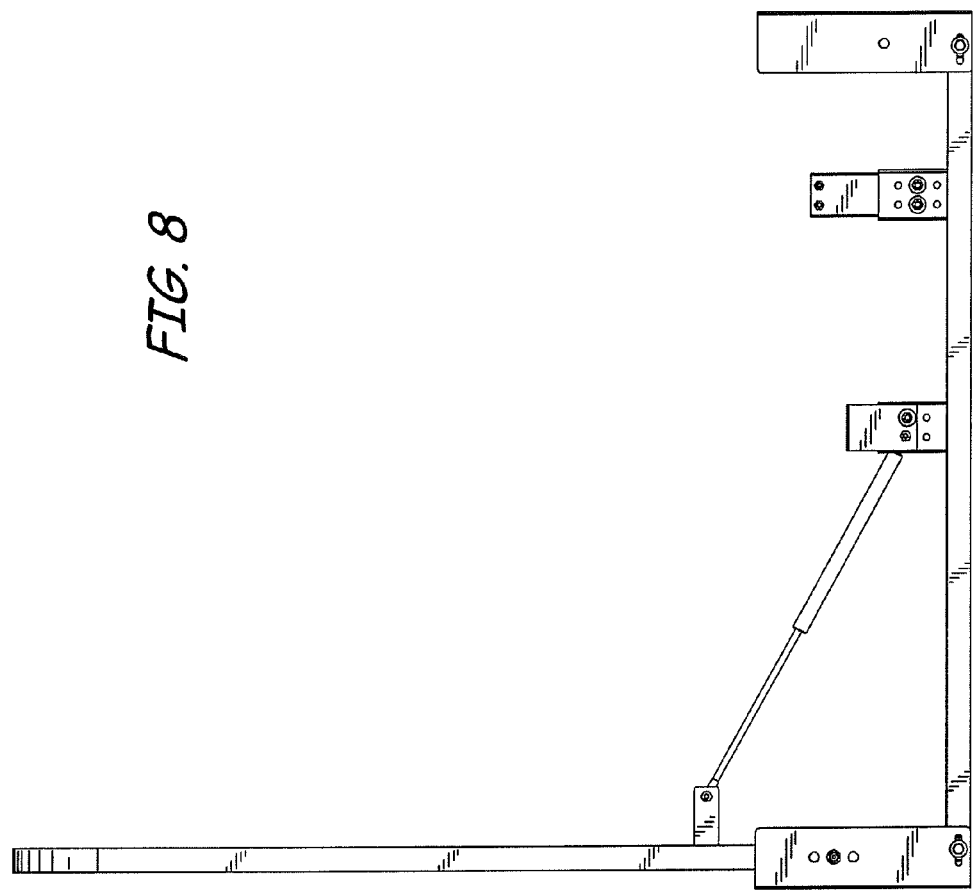
FIG. 8 is a bottom view of the single door storage rack of the present invention with the door panel in its open position.
Figure 8A:
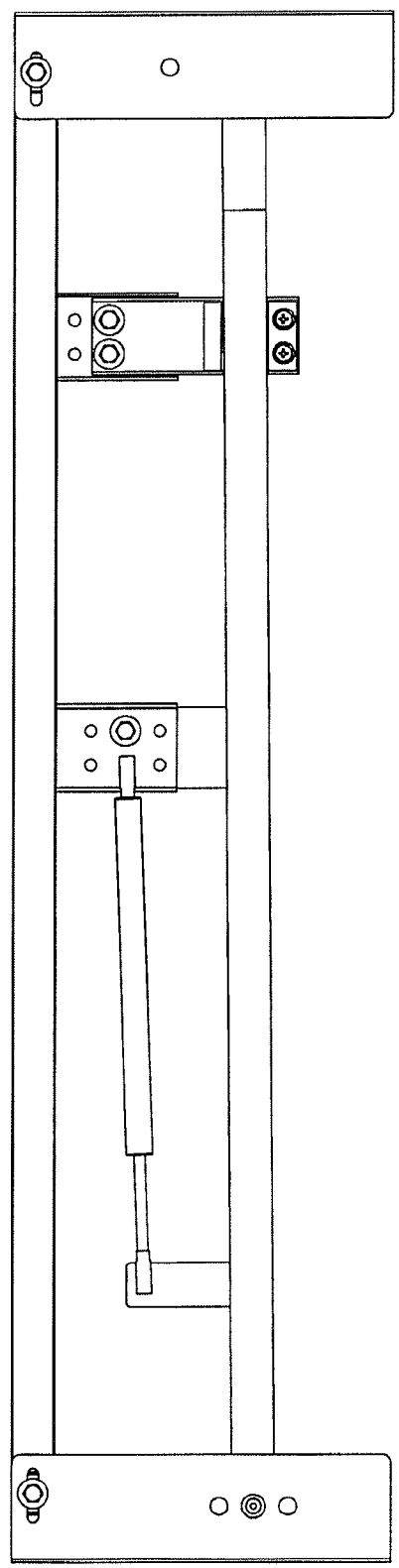
FIG. 8A is a top view of the single door storage rack of the present invention with the door panel in a closed position.

When the door panel 70 is rotated to its closed position, the rod 92 is forced to retract into the cylinder 90; however, the spring assembly continues to apply a force against the door panel 70. In the closed position, as shown in FIG. 8A, the spring assembly 28 is oriented at an acute angle with the door panel 70 due to the positioning of rod 92 on support tab 86 and cylinder 90 on support bracket 32. In this configuration, the spring assembly 28 continues to apply a bias force against the support tab 86 causing the door panel to remain in its closed position.

A double door embodiment of the storage rack of the present invention is shown at 110 in FIGS. 9-16. The double door storage rack 110 includes a generally rectangular back panel 120 and two generally rectangular door panels 170 and 190. The door panels 170 and 190 are each pivotally secured at a first end to a mounting assembly 147 in opposing relation, much like cabinet doors. Door panels 170 and 190 rotate between a closed position substantially parallel to the back panel 120 and an open position generally perpendicular to the back panel 120. The storage rack 110 is designed to be mounted within a recess in the side of a motor vehicle or a wall in a building. The back panel 120 ideally is secured to a back wall of the recess behind the mounting assembly 148 but may be secured to the mounting assembly 148.

The back panel 120 includes vertical frame members 121V and horizontal frame members 121H. The frame members are, in one embodiment, tubular steel having a generally square cross section, although other cross section configurations or other types of frame members can be utilized. Secured between the frame members is a grid 122 comprised of generally equidistantly spaced and parallel pairs of horizontal wires 124 secured to generally equidistantly spaced and parallel vertical wires 126. The wires may be of any desired size, although in one preferred embodiment, the wires have a ¼ inch diameter. Pairs of horizontal wires provide additional strength and are used to support tool holders, which in turn support the desired articles and tools on the grid 122; however, other configurations are possible, including single horizontal wire configurations.

The mounting assembly includes mounting members 150T and 150B and cross supports 164T and 164B. Mounting members 150T are connected together in spaced relation by cross support 164T. Mounting members 150B are connected together in spaced relation, substantially the same distance as mounting members 150T, by cross support 164B. Mounting members 150T and cross support 164T are positioned above mounting members 150B and cross support 164B so that each mounting member 150T is vertically aligned above a corresponding mounting member 150B as shown in FIGS. 9-16.

Figure 10:
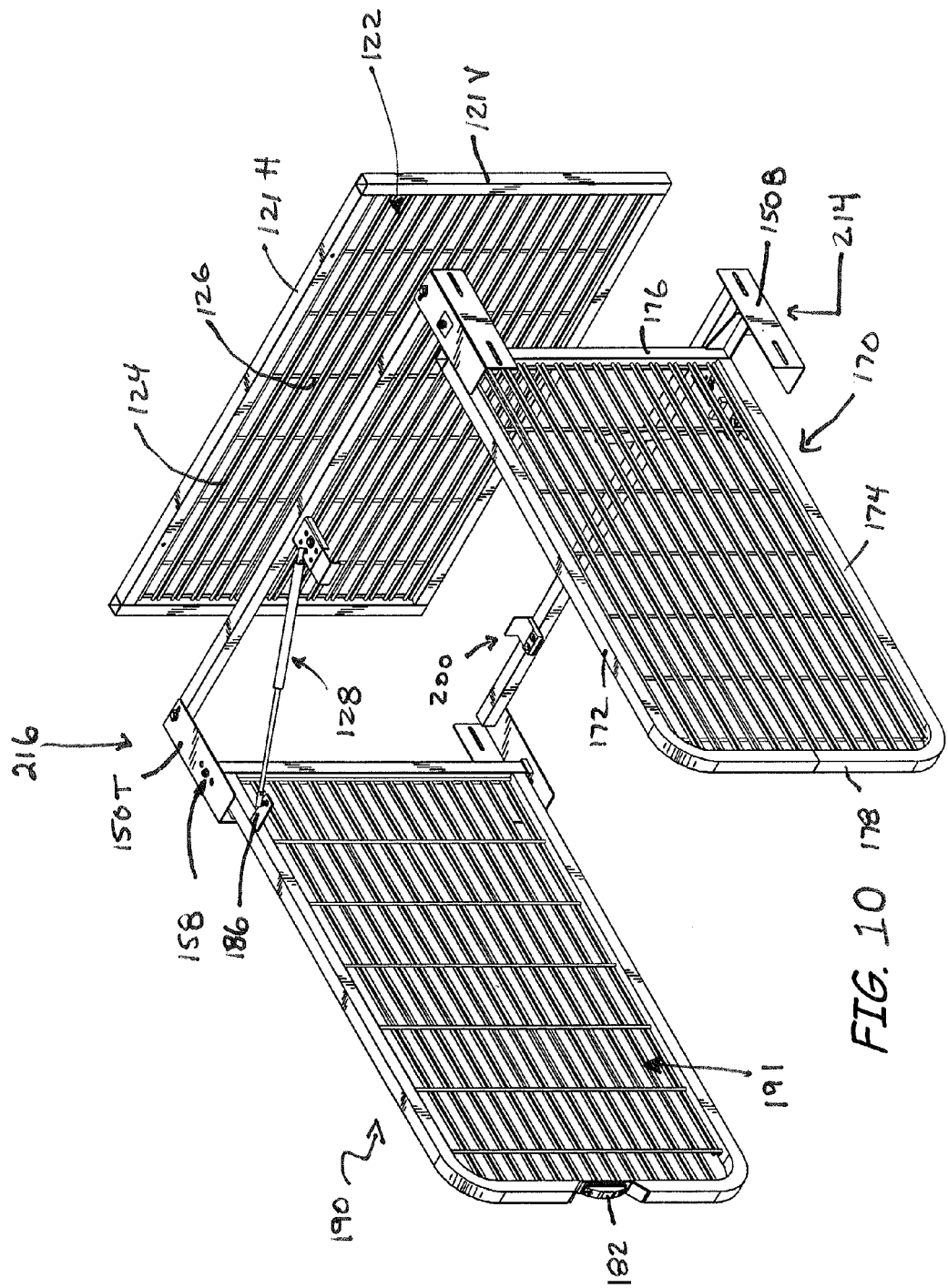
FIG. 10 is a perspective view of the double door storage rack of the present invention with the back panel detached and spaced from the mounting assembly supporting the two door panels, opposite that of FIG. 1.
Figure 11:
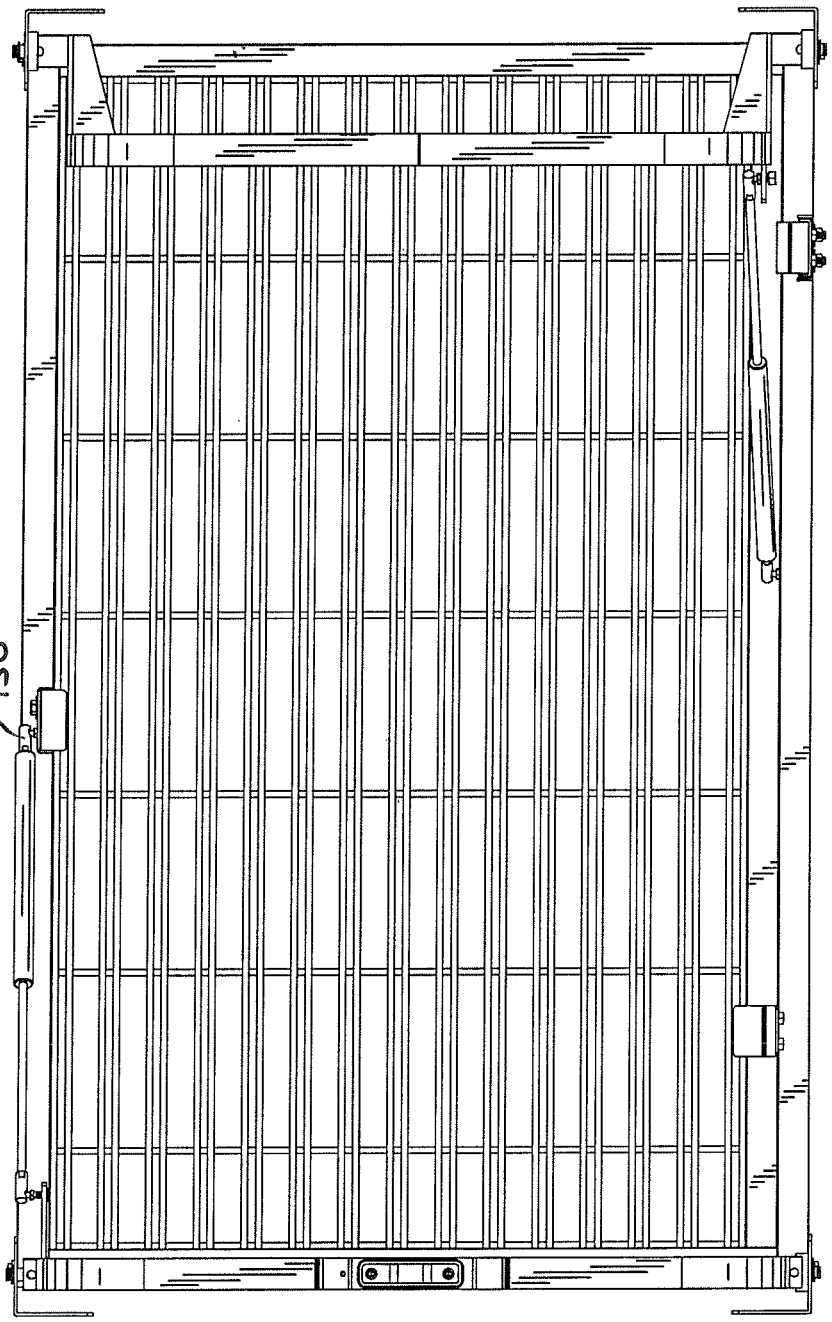
FIG. 11 is a front view of the double door storage rack of the present invention with the back panel detached and spaced from the mounting assembly supporting the two door panels.
Figure 12:
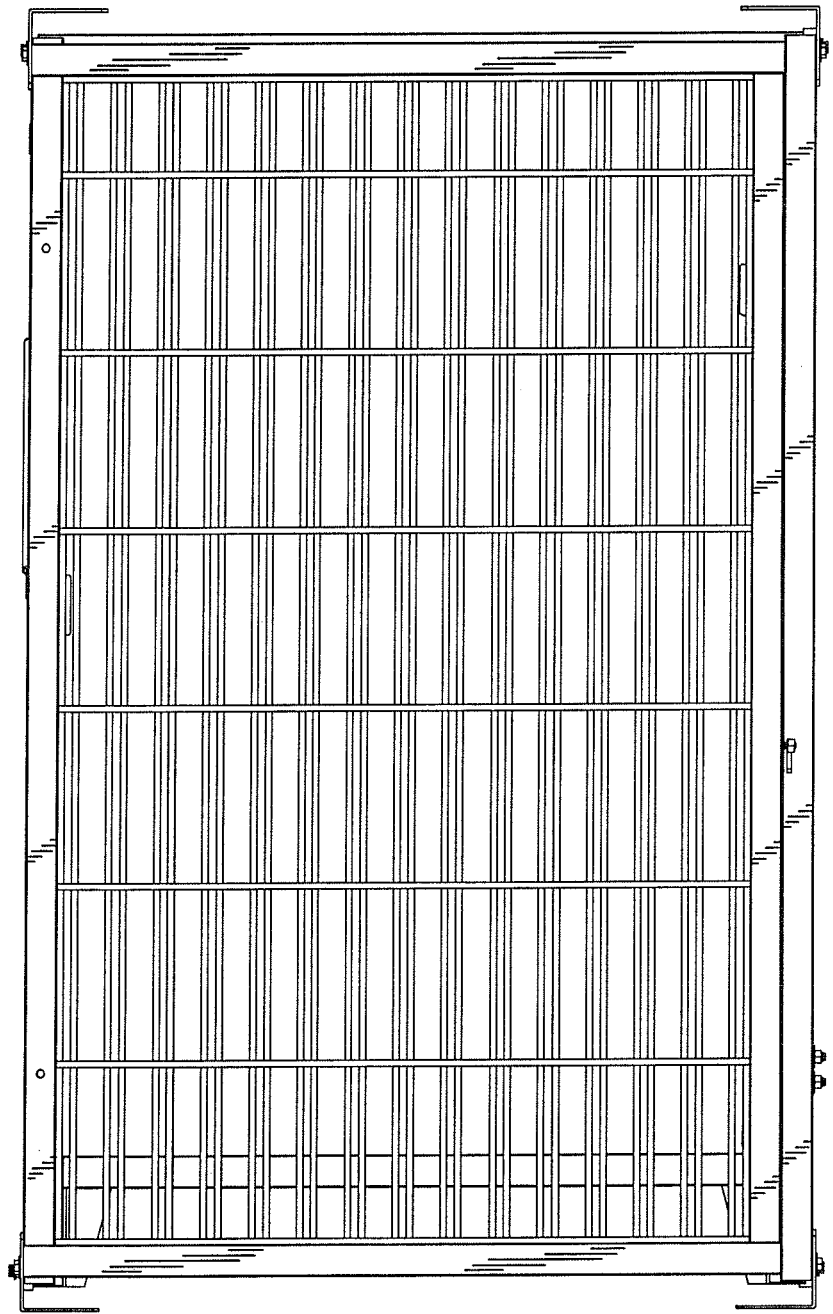
FIG. 12 is a rear view of the double door storage rack of the present invention with the back panel attached to the mounting assembly supporting the two door panels.
Figure 13:
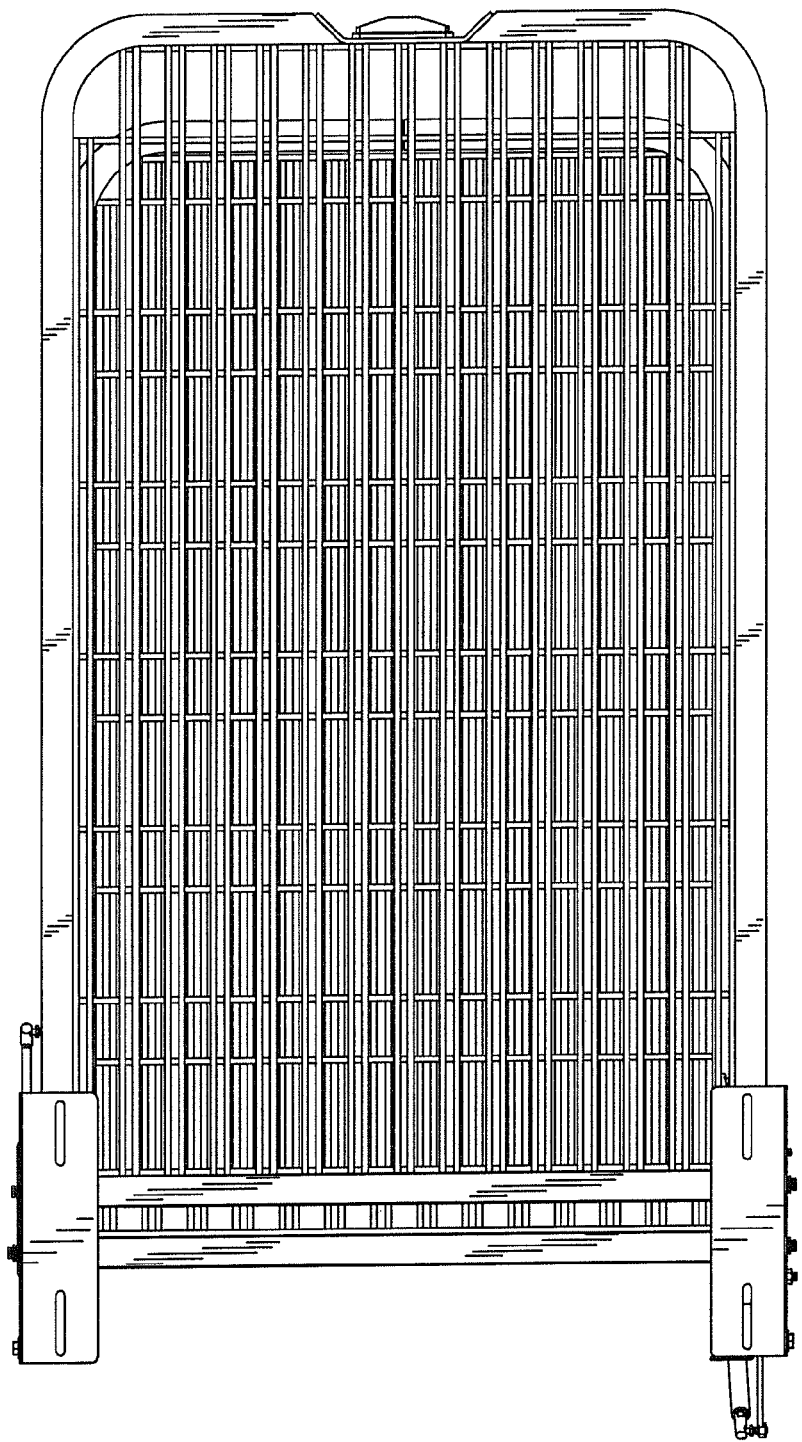
FIG. 13 is a side view of the double door storage rack of the present invention with the back panel detached and spaced from the mounting assembly supporting the two door panels.
Figure 14:
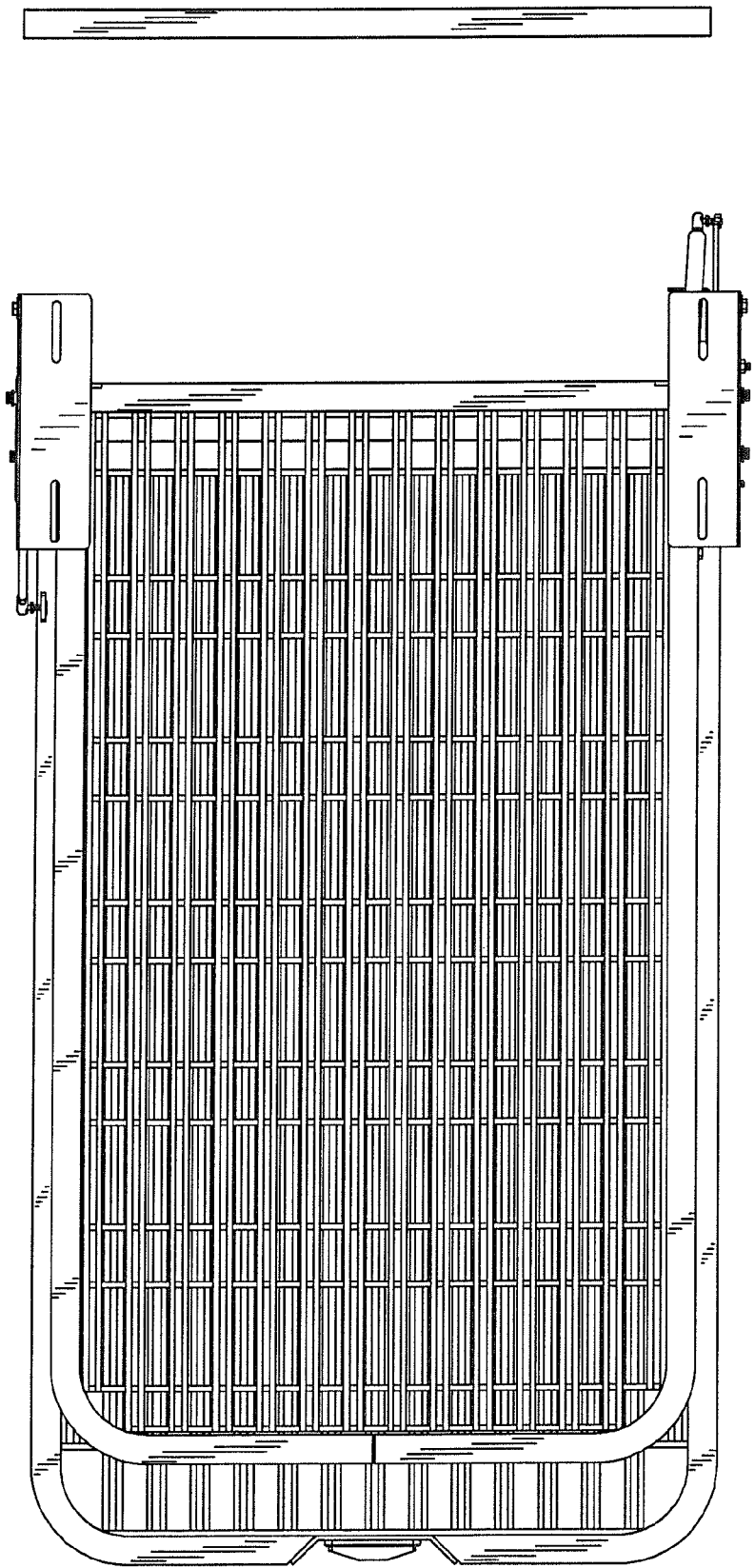
FIG. 14 is a side view of the double door storage rack of the present invention with the back panel detached and spaced from the mounting assembly supporting the two door panels, opposite that of FIG. 13.
Figure 15:
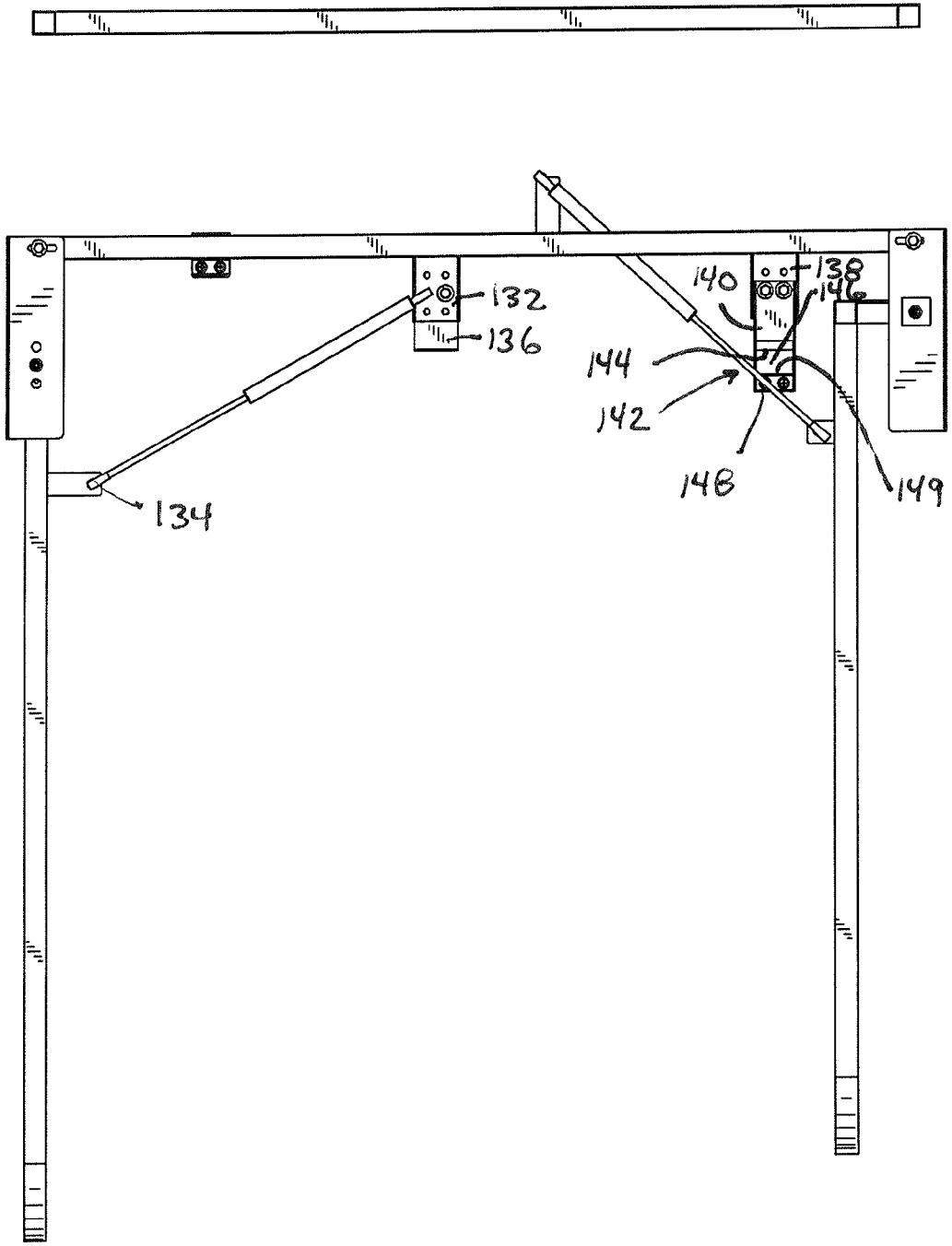
FIG. 15 is a top view of the double door storage rack of the present invention with the back panel detached and spaced from the mounting assembly supporting the two door panels.
Figure 16:
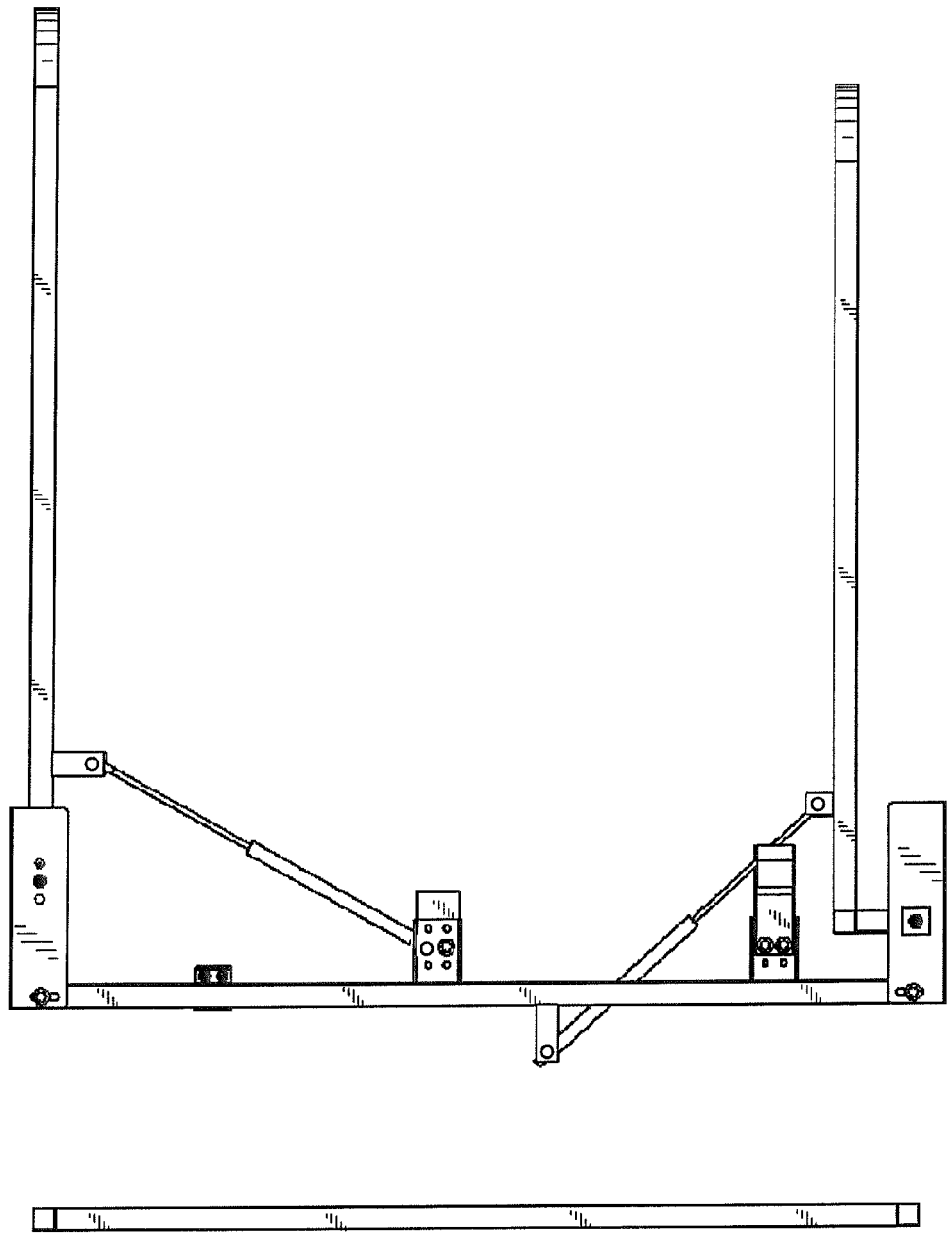
FIG. 16 is a bottom view of the double door storage rack of the present invention with the back panel detached and spaced from the mounting assembly supporting the two door panels.

Mounting members 150T and 150B have an L-shaped cross section. Various holes and slots are provided on both "legs" of the mounting members 150 to facilitate securing the door panels 170 and 190 to the mounting members 150, as well as providing openings for fasteners to secure the mounting members 150T and 150B within the corners of a recess in a building or vehicle wall. Adjustment holes, such as those shown at 158 in FIG. 10, are placed in close proximity to permit adjustment of the location of door panel 190 on the mounting members 150 with respect to the back panel 120.

Cross supports 164T and 164B are generally tubular steel with a square cross section, but may be made in different configurations. Mounted on and extending forward from cross support 164T is a stop support bracket 132 to which is attached an L-shaped downward facing stop 136 to limit the rotation of the door panel 190 towards the back panel 120, so that when door panel 190 is in its closed position, it will be positioned substantially parallel to and spaced from the back panel 120. Mounted on and extending upward from cross support 164B is a latch 200, similar to latch 42, to limit the rotation of the door panel 170 towards the back panel 120 and engage and retain door panel 170 is in its closed position positioned substantially parallel to and spaced from the back panel 120. Stop 136 extends further forward than does latch 200 to assure space between door panels 170 and 190 when in their closed positions.

Also mounted on and extending outward from the cross support 164B is a latch support bracket 138. Secured to the bracket 138 is a spring plate 140 that can be flexed up and down. On the end of the spring plate 140 is a U-shaped latch 142. Latch 142 includes at an end nearest the back panel 120 a vertical abutment 144 that acts as a stop to limit rotation of the door panel 190 towards the back panel 120 (much the same as stop 136). In front of the vertical abutment 144 is a horizontal support surface 146 for supporting the bottom of the door panel 190 when in its closed position and in front of the horizontal surface 146 is an inclined lip 148 that creates a ridge 149 (see FIGS. 9 and 16) at the back side of the lip 148, facing the abutment 144, which is higher than the support surface 146 of the latch 142.

Door panel 170 includes horizontal tubular frame members 172 (top) and 174 (bottom) and side frame members 176 and 178 having a generally square cross-sectional configuration. Secured between the frame members is a grid 171 similar to grid 122 on back panel 120. Door panel 190 includes horizontal tubular frame members 192 (top) and 194 (bottom) and side frame members 196 and 198 having a generally square cross section configuration. Secured between the frame members is a grid 191 similar to grid 122 on back panel 120. Door panel 170 is vertically narrower than door panel 190, the top frame member 172 of door panel 170 is vertically lower than the corresponding top frame member 192 of door panel 190, and the bottom frame member 174 of door panel 170 is vertically higher than the corresponding bottom frame member 194 of door panel 190. This is so that door panel 170, when rotated to its closed position, will clear stop 136 and latch 142, so that door panel 190 can engage stop 136 and door latch 142.

Figure 9:
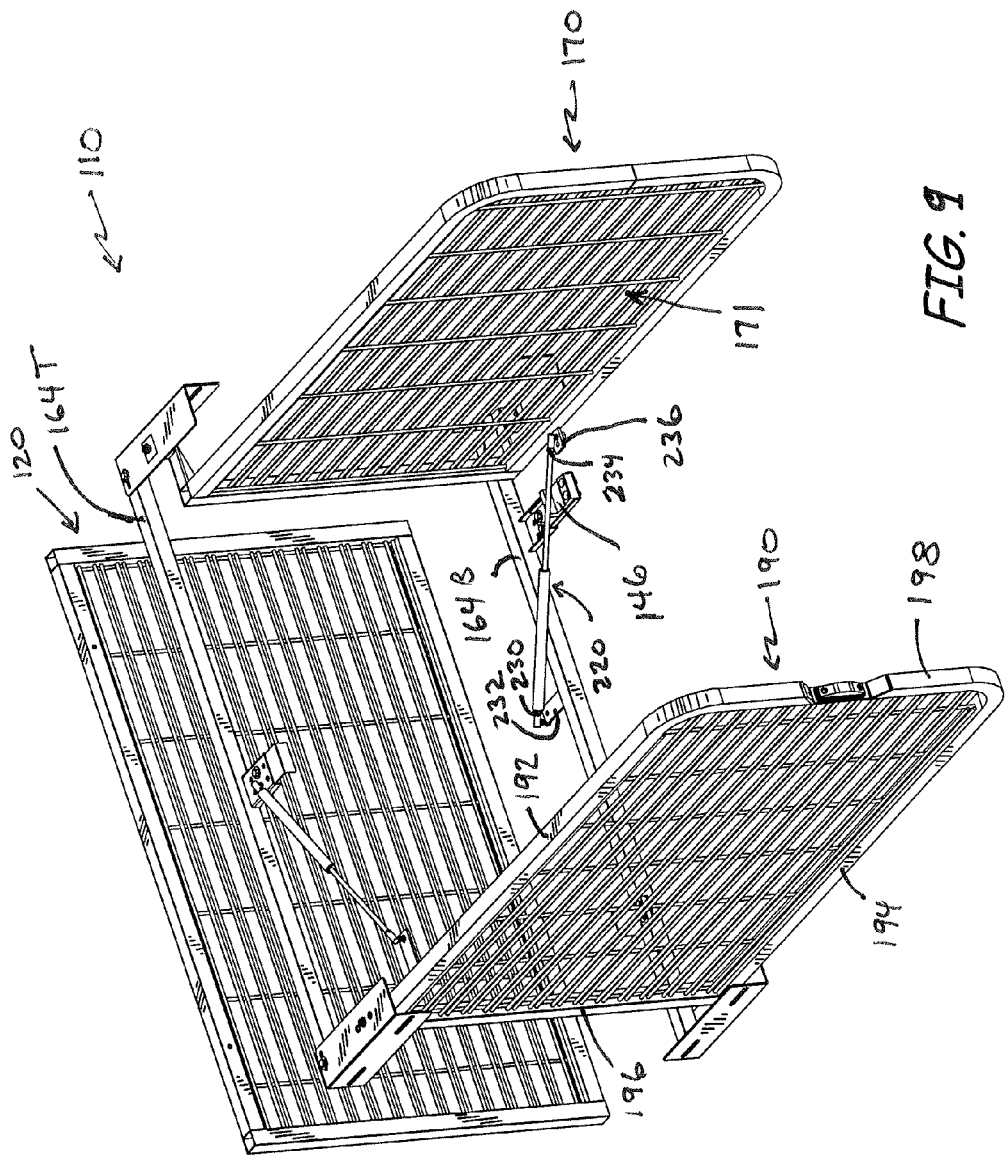
FIG. 9 is a perspective view of a double door storage rack of the present invention with the back panel detached and spaced from the mounting assembly supporting two door panels in their open position.

Door panel 170 is pivotally secured at a first end 176 between a pair of vertically aligned top and bottom mounting members 150T and 150B as shown at 214 in FIG. 10. Door panel 170 is pivotally mounted to the support members 150 so that in an open position, it is laterally spaced inward from the mounting members 150, forward of the cross supports 164, as shown in FIG. 9. In this offset mounted position, door panel 170 will rotate to its closed position between the cross supports 164T and 164B when door panel 170 is in its closed position. Door panel 190 is pivotally secured at a first end 196 between a pair of vertically aligned top and bottom mounting members 150T and 150B as shown at 216 in FIG. 10.

A spring assembly 128 is pivotally secured at a first end 130 to and above support bracket 132 which extends forward from the upper cross support 164T (towards the door panel 190 when in its closed position). A second end 134 of the spring assembly 128 pivotally engages a support tab 186 extending laterally inward from the top frame member 194 of door panel 190. Likewise, a spring assembly 220 is pivotally secured at a first end 230 to and above support bracket 232 which extends backward from the lower cross support 164B (towards the door panel 120). A second end 234 of the spring assembly 220 pivotally engages a support tab 236 extending laterally inward from the bottom frame member 174 of door panel 170. Spring assemblies 220 and 128 work as described in the single door panel configuration.

When door panels 170 and 190 are rotated to their closed position, (door panel 170 must be closed first), the door panel bottom frame members will engage the latch members as described with the single door panel embodiment, to releasably engage the door panels in their closed position. The door panels can be opened in the same fashion as described in the single door panel embodiment.

Frame member 198 has a shallow U-shaped configuration and is curved where it meets the top and bottom frame members 192 and 194 for aesthetic and safety reasons. In the middle of the frame member on the free side 198 of door panel 190, the tubular frame is replaced with a steel plate rather than tubular steel to permit the placement of a light 182. Door panel 170 may also be modified in this manner to include a light.

What is claimed is:

1. A storage rack for viewing and drying tools, mountable within a recess defined in a wall of a motor vehicle, the recess having a back wall, opposed top and bottom walls and opposed first and second side walls, comprising:
   a. a back panel including at least one tool support;
   b. at least one mounting member for securing the back panel within the recess adjacent to the back recess wall and for pivotally securing a first swing panel in spaced relation from and forward of the back panel;
   c. a first swing panel consisting of a framework defining at least one tool support member and a plurality of spatial openings of sufficient size to permit viewing of and the free flow of air to and around tools supported on and between the first and back panel, the first swing panel being pivotally mounted at a first end to the at least one mounting member for pivotal movement of the first swing panel between an open position substantially perpendicular to the back panel and a closed position substantially parallel and sufficiently spaced from the back panel to permit tools to be mounted on and between the first swing panel and back panel;
   d. a second swing panel consisting of a framework defining at least one tool support member and a plurality of spatial openings to permit viewing of and the free flow of air to and around tools supported on and between the first, second and back panels, the second swing panel being pivotally mounted at a first end to at least one mounting member positioned along the second side wall of the recess, opposite that of the first side, for rotation between an open position substantially perpendicular to the back panel and a closed position substantially parallel to and spaced forward from and substantially overlapping the first swing panel to permit tools to be mounted on and between the first and second swing panels; and
   e. a first latch for engaging the first swing panel in its closed position to secure the first swing panel in spaced, substantially parallel orientation with the back panel and prevent removal of tools stored on the swing and back panels.

2. The storage rack of claim 1 wherein the first swing panel is a wire grid panel.

3. The storage rack of claim 2 wherein the back panel consists of a framed wire grid defining at least one tool support member and a plurality of spatial openings.

4. The storage rack of claim 1 further comprising a spring assembly secured to the back panel and first swing panel for maintaining the first swing door panel in its open or closed position.

5. The storage rack of claim 1 wherein the latch includes a door stop.

6. The storage rack of claim 1 wherein the back panel and first swing panel are substantially planar.

7. The storage rack of claim 1 wherein the back panel consists of a framework defining at least one tool support member for supporting tools.

8. The storage rack of claim 1 wherein the back panel and the first swing panel includes a wire grid defining spatial openings.

9. A storage rack for mounting within a recess defined in a wall, the recess having a back, top, bottom and opposing side walls, comprising:
   a. a generally planar back panel consisting of a frame defining tool supports and a plurality of spatial openings;
   b. means for securing the back panel on or adjacent to the back wall of the recess;
   c. a tool support assembly including:
      i. a first swing panel consisting of a frame defining tool supports and a plurality of spatial openings of sufficient size to permit viewing of tools supported on the first and back panels and the free flow of air to and around tools supported on and between the first swing panel and back panel;
      ii. a second swing panel consisting of a frame defining tool supports and a plurality of spatial openings of sufficient size to permit viewing of tools supported on the first, second and back panels and the free flow of air to and around tools supported on and between the first swing panel, second swing panel and the back panel; and
      iii. at least one mounting member for pivotally mounting the first swing panel within and on or adjacent to a first side of the recess in spaced relation to the back panel, for movement between an open position substantially perpendicular to the back panel and a closed position substantially parallel to and sufficiently spaced from the back panel such that tools can be stored on and between the first swing panel and back panel and can be viewed through the spatial openings of the first swing panel and air can freely flow through the spatial openings to the tools;
      iv. at least one mounting member for pivotally mounting the second swing panel within and along a second side of the recess, opposite the first side of the recess, in front and in spaced relation to the first swing panel, for movement between an open position substantially perpendicular to the back panel and first swing panel and a closed position substantially parallel to and sufficiently spaced forward from and substantially overlapping the first swing panel such that tools can be stored on and between the first and second swing panels and can be viewed through the spatial openings of the second swing panel and air can freely flow through the spatial openings to the tools; and
      v. a front swing panel latch for fixing the second swing panel in its closed position to prevent removal of tools stored on the first and second swing panels and back panel.

10. The storage rack of claim 9 wherein the first swing panel is offset from its pivot axis, such that when the first swing panel is in its open position, the first swing panel is positioned in spaced relationship from the first recess side wall and when the first swing door is in its closed position, it is generally parallel to the back panel.

11. The storage rack of claim 9 wherein there are four mounting members, vertically aligned first upper and first lower mounting members mounted along the first side wall of the recess for pivotally supporting the first swing panel and vertically aligned second upper and second lower mounting members mounted along the second side wall of the recess for pivotally supporting the second swing panel.

12. The storage rack of claim 9 wherein there are four mounting members, first upper and first lower vertically aligned mounting members mounted along the first side wall of the recess for pivotally supporting the first swing panel and second upper and second lower vertically aligned mounting members mounted along the second side wall of the recess for pivotally supporting the second swing panel, and further comprising:
  a. a top cross bar secured between the upper first and second mounting members; and
  b. a bottom cross bar secured between the lower first and second mounting members,
  wherein the cross bars define an opening for accessing tools on the back panel when the swing panels are in the open position.

13. The storage rack of claim 9 wherein the recess exists within a side or rear of a motor vehicle.

14. The storage rack of claim 9 further comprising a light mounted on either or both of the first and second swing panels for illuminating the storage rack.

15. The storage rack of claim 9 further comprising a back swing panel latch for fixing the first swing panel in its closed position to prevent removal of tools stored on the first swing panel.

* * * * *